United States Patent

Lange

[11] 4,065,779
[45] Dec. 27, 1977

[54] CAMERA WITH ELECTRONIC FLASH DEVICE

[75] Inventor: Karl Heinz Lange, Bunde, Germany

[73] Assignee: Balda-Werke Photographische Gerate und Kunststoff GmbH & Co., KG, Bunde, Germany

[21] Appl. No.: 742,392

[22] Filed: Nov. 15, 1976

[30] Foreign Application Priority Data

Nov. 29, 1975 Germany .............................. 2553843

[51] Int. Cl.² .............................................. G03B 15/05
[52] U.S. Cl. ...................................... 354/145; 354/126
[58] Field of Search ........................ 354/145, 126, 135

[56] References Cited
FOREIGN PATENT DOCUMENTS 1,240,385   5/1967   Germany .............................. 354/145

*Primary Examiner*—Edna M. O'Connor
*Attorney, Agent, or Firm*—Blum, Moscovitz, Friedman & Kaplan

[57] ABSTRACT

A camera which has the capability of making exposures according to aperture, distance, and exposure-time settings and which can also make flash exposures is provided with a housing which carries an adjustable structure movable with respect to the camera housing to provide one of the above settings, this adjustable structure also having a flash position at which it can be set with respect to the camera housing. An electronic flash device is capable of being removably connected with the camera housing by way of a connecting structure carried in part by the flash device and in part by the camera housing. This electronic flash device has a normally open switch which must be closed to render the electronic flash device operative. A switch-operating member is movably carried by the camera housing for movement with respect thereto between a rest position and a switch-closing position where the switch-operating member cooperates with the switch of the flash device to close the latter switch. The adjustable structure when displaced to its flash position engages the switch-operating member to displace the latter to its switch-closing position so as to render the flash device operative.

7 Claims, 2 Drawing Figures

CAMERA WITH ELECTRONIC FLASH DEVICE

BACKGROUND OF THE INVENTION

The present invention relates to cameras.

In particular, the present invention relates to that type of camera which is capable of having an electronic flash device attached thereto, this flash device having for its charging circuit a spring-loaded switch which is normally open.

With certain known cameras of this type, the arrangement is such that when the electronic flash is not attached to the camera discharge of the flash device is prevented. For this purpose the flash device has a switch which assumes an open position when the flash device is not attached to the camera. However, an important disadvantage of this type of known device resides in the fact that special manipulations are required when the flash device is attached to the camera while an exposure is to be made without utilizing the flash device. For this purpose it is necessary on the one hand to adjust the camera to provide proper exposure settings while on the other hand it is required to open a second switch connected into the circuit of the flash device so as to prevent undesired operation of the flash device.

Thus, such a construction requires a pair of switches to be connected in series, and the result is that known flash devices of this type are subject to improper operation.

Other types of known cameras, exemplified by U.S. Pat. No. 3,273,479, have a flash device permanently connected to the camera and capable of receiving a flash lamp. With this type of camera the problem solved by the present invention does not arise. With this particular type of camera, the flash housing is opened by swinging the reflector upwardly with respect to the camera housing, and the camera is by this operation adjusted so as to assume the required flash setting instead of the previous exposure settings. Adjustment of the flash device according to given exposure settings is not possible.

SUMMARY OF THE INVENTION

It is accordingly a primary object of the present invention to solve the problem referred to above with that type of camera which has a housing on which an electronic flash device can be mounted.

Thus, it is an object of the present invention to provide for a camera of this type an assurance that the circuit of the flash device is open and in an inoperative condition when the flash device is not to be used, even though the flash device is mounted on the camera.

In particular it is an object of the present invention to provide a construction according to which the circuit of the flash device will be automatically closed by adjustment of an element of the camera used for providing an exposure setting such as the setting of the aperture, the exposure time, or the distance.

It is furthermore an object of the present invention to provide a construction according to which a switch-operating member will be displaced at an opening in an outer housing wall of the camera in part outwardly beyond this outer housing wall when the camera is set to make a flash exposure.

Furthermore it is an object of the present invention to provide a switch-operating member of this type which is supported by the camera housing for movement with respect thereto.

Moreover, it is an object of the present invention to provide a construction according to which the switch-operating member is actuated by an adjustable component movable with respect to the housing of the camera in one case along a substantially straight path and in another case around the optical axis.

In particular with this latter type of construction it is an object of the present invention to provide an arrangement according to which the adjustable member rotates around the optical axis and has a cam for actuating the switch-operating member.

According to the invention the camera which is capable of making exposures according to aperture, distance and exposure-time settings and which is also capable of making flash exposures has a housing means as well as an adjustable means movable with respect to the housing means to provide one of the above settings, this adjustable means also having a predetermined flash position with respect to the housing means. An electronic flash means is capable of being removably connected with the camera housing means by way of a connecting means carried in part by the housing means and in part by the electronic flash means. This electronic flash means has a normally open switch for rendering the flash means inoperative when the latter switch is in its open position. A switch-operating means is movably carried by the housing means for movement between a rest position and a switch-closing position where the switch-operating means cooperates with the normally open switch to close the latter so as to render the flash means operative when it is connected to the camera housing means. The adjustable means when displaced to its flash position engages the switch-operating means to displace the latter to its switch-closing position, so that in this way the electronic flash means is rendered operative by positioning of the adjustable means in its flash position.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
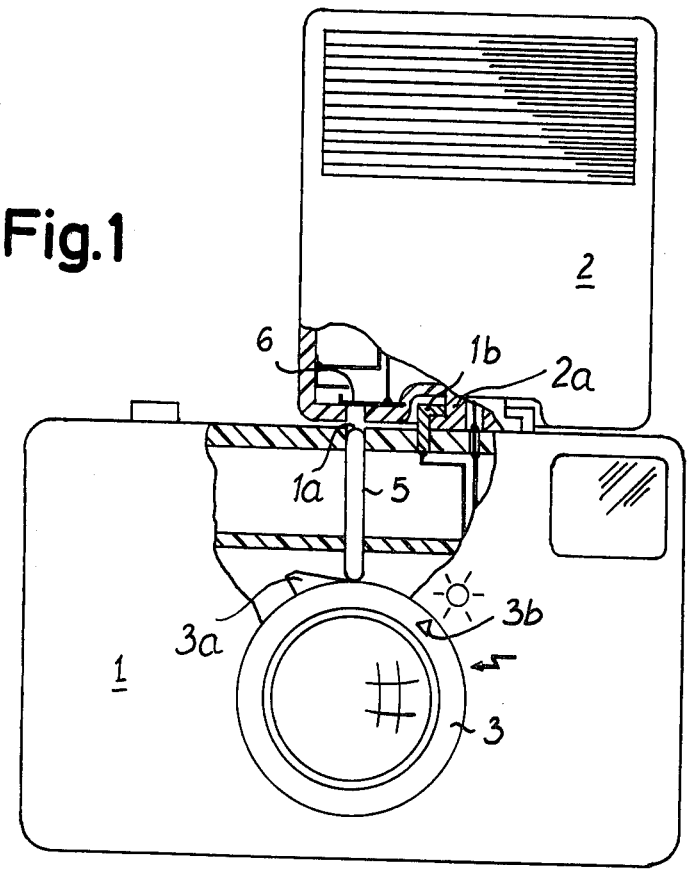
FIG. 1 is a partly sectional schematic illustration of one embodiment of the invention with the structure shown in FIG. 1 in a condition where the electronic flash means is connected with the camera housing means.

Referring first to FIG. 1, the camera illustrated therein includes a housing means 1. This camera is capable of making exposures according to aperture, distance, and exposure-time settings, and it is also capable of making flash exposures when the electronic flash means 2 is connected with the housing means 1 in the manner illustrated in FIG. 1. In the example of FIG. 1, the housing means 1 carries an adjustable means 3 in the form of a ring capable of being turned about the optical axis and capable of setting the aperture. Thus the adjustable means 3 is movably carried by the housing means 1 for setting the diaphragm of the camera to provide a given exposure aperture. The ring 3 carries an index 3b which is shown in FIG. 1 in alignment with a symbol indicating the setting of the aperture for making a daylight exposure. This rotary adjustable means 3, which is carried by the housing means 1, has a cam 3a which turns with the ring 3 for a purpose referred to below.

The housing means 1 supports for longitudinal movement a switch-operating means in the form of an elongated pin 5 which is supported in the manner shown in FIG. 1 by the housing means 1 for longitudinal movement so that the pin 5 will move vertically in the position of the parts shown in FIG. 1. When the ring 3 is set to provide an aperture suitable for daylight exposure, the pin 5 engages the periphery of the ring 3 and is in the position illustrated where the upper end of the pin 5 extends into an opening 1a formed in an outer wall of the housing means 1. At this time the upper end of the pin 5, as viewed in FIG. 1, does not project outwardly beyond the opening 1a. However, when the ring is turned to situate the index 3b in alignment with the symbol indicating the flash position of the ring 3, the cam 3a acts on the pin 5 to displace the latter upwardly so that its upper end, as viewed in FIG. 1, projects outwardly beyond the outer wall of the housing means 1 at the opening 1a thereof.

The electronic flash means 2 is capable of being removably connected with the housing means 1 by way of a connecting means carried in part by the housing means 1 and in part by the flash means 2. Thus it will be seen that the housing means 1 carries at its upper wall a conventional shoe 1b capable of receiving the foot 2a of the flash means 2, in a manner which is well known in the art. When the flash means 2 is thus connected by this connecting means 1b, 2a to the housing means 1, electrical components indicated in part in FIG. 1 engage each other so as to provide for actuation of the flash means 2 in synchronism with opening of the shutter of the camera as is well known.

The electronic flash means 2 has a conventional charging circuit which includes the normally open switch 6. As is apparent from FIG. 1, a springy contact of the switch 6 normally assumes the illustrated position extending across an opening of the flash means 2 which is in alignment with the opening 1a and which is adapted to receive the pin 5 when the latter is displaced by the cam 3a. Thus, when the ring 3 is turned to displace the index 3b from the daylight position shown in FIG. 1 to the flash position indicated by the arrow at the exterior surface of the housing means 1, the cam 3a will displace the pin 5 upwardly, as viewed in FIG. 1, so that the pin 5 will automatically close the switch 6, thus rendering the flash means 2 operative. The pin 5 may carry between its ends a collar and may be surrounded just above this collar by a spring pressing on this collar as well as against the inner surface of the upper wall of the housing means 1, as viewed in FIG. 1, so that through such an arrangement the pin 5 will always be urged into engagement with the ring 3.

It is apparent, therefore, that with this construction the operator need not carry out any special manipulations to make certain that the circuit of the flash means 2 is open when the flash means 2 is mounted on the housing 1 and it is not desired to make a flash exposure. This result will follow automatically from the setting of the adjustable means 3. When the latter means is placed in its flash position, the switch 6 will be automatically closed by the switch-operating means 5, so as to render the flash means 2 operative.

Figure 2:
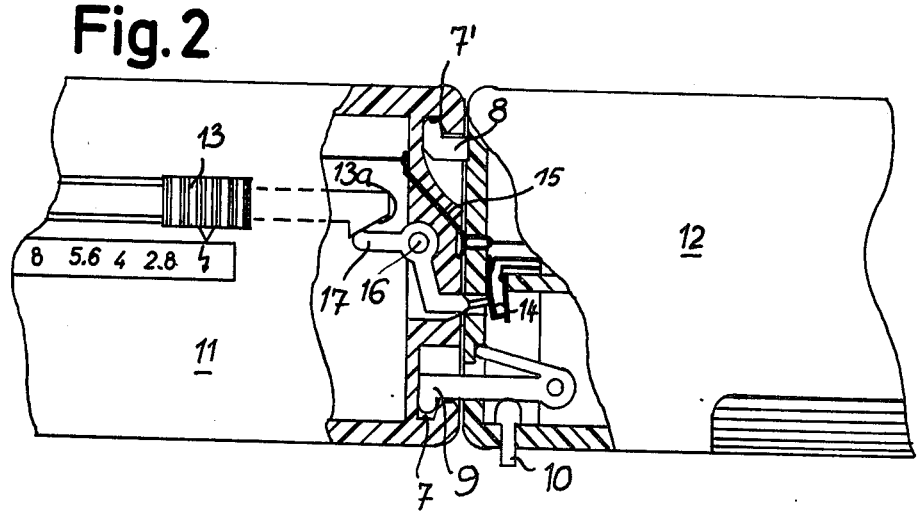
FIG. 2 is a fragmentary partly sectional schematic illustration of another embodiment of the invention with the structure of FIG. 2 also being shown in the condition where the electronic flash means is connected with the camera housing means.

According to the embodiment of the invention which is illustrated in FIG. 2, the electronic flash means 12 is of the type which can be attached to the camera housing means 11 so as to extend from a side thereof. In this embodiment the switch-operating means takes the form of a lever 17 supported for turning movement by a pivot 16 carried by the housing means 11. The lever 17 has a portion situated also in an opening which passes through an outer wall of the housing means 11. When the flash means 12 is connected to the housing means 11, as shown in FIG. 2, an opening in the housing of the flash means 12 is aligned with this opening of the housing means 11 which receives part of the lever 17. A normally open switch 14 has a springy blade extending across the opening of the housing of the flash means 12 which becomes aligned with the opening of the housing means 11 which receives part of the lever 17. In the illustrated example the normally open switch 14 carries a projection which is engaged by the free end of the lever 17 shown at the lower right of the lever 17, as viewed in FIG. 2, when this lever 17 is turned in a counterclockwise direction about the pin 16, as viewed in FIG. 2, to the switch-closing position shown in FIG. 2.

In the embodiment of the invention which is shown in FIG. 2, the housing means 11 of the camera carries an adjustable means 13 which is guided for movement along a substantially straight path for setting the aperture of the camera. Thus FIG. 2 fragmentarily illustrates several diaphragm settings with which an index of the adjustable means 13 can be aligned during the straight-line movement of the adjustable means 13, so as to provide the camera with a predetermined aperture setting. The housing means 11 also has a flash setting for the adjustable means 13 which is shown in FIG. 2 with its index aligned with this flash setting so that the adjustable means 13 as shown in FIG. 2 in its flash position. This adjustable means 13 fixedly carries a projection which has an inclined surface 13a forming a cam cooperating with the lever 17 to turn the latter to the switch-closing position shown in FIG. 2 when the adjustable means 13 is placed in its flash position as illustrated in FIG. 2. Any unillustrated spring can cooperate with the lever 17 to urge the latter in a clockwise direction, as viewed in FIG. 2, about the pin 16.

In the example of FIG. 2, the connecting means for removably connecting the flash means 12 to the camera housing means 11 includes the substantially L-shaped member 8 which is fixed to and projects from the housing of the flash means 12, this projection 8 being received in the opening 7' which is formed in the housing means 11. The housing of the flash means 12 also carries a projection 9 supported for turning movement on a pin in the housing of the flash means 12 and having a springy portion engaging part of the housing of the flash means 12, as illustrated in FIG. 2, so that the projection 9 is resiliently urged to the illustrated position from which it can be displaced when the operator depresses the pin 10. This projection 9 is capable of being received in the opening 7 which is formed in the camera housing means 11. Thus, to attach the flash means 12 to the housing means 11 the operator will place the projection 8 within the opening 7' and will push the free outer end of the element 9 into the opening 7 this element 9 first yielding and then snapping to the position shown in FIG. 2 so as to retain the flash means 12 in the illustrated position. When it is desired to remove the flash means 12 the operator depresses the pin 10 so as to displace the projection 9 to a position where the flash means 12 can be removed from the camera housing means 11.

The illustrated conductor 15, shown in FIG. 2, forms one of a pair of conductors which are situated one after the other and which engage each other when the flash means 12 is connected with the housing means 11 so as to form part of the flash circuit.

It is thus apparent from the above description that with the camera and flash means of the invention there is provided a solution to an old practical problem in an entirely satisfactory manner. There is not merely provided a switch capable of being opened so as to protect the battery when the flash device is not attached to the camera. Instead with the construction of the invention there is assurance that the flash device is only ready to provide flash illumination when a flash exposure is actually desired, which is to say when the camera has been correspondingly adjusted to make a flash exposure.

What is claimed is:

1. In a camera which is adapted to make exposures according to aperture, distance, and exposure-time settings and which also is adapted to make flash exposures, housing means, adjustable means movably carried by said housing means for providing one of said settings, and said adjustable means having with respect to said housing means a predetermined flash position, electronic flash means and connecting means carried in part by said electronic flash means and in part by said housing means for removably connecting said electronic flash means to said housing means, said electronic flash means having a normally open switch which must be closed to render said electronic flash means operable, and switch-operating means carried by said housing means for movement with respect thereto from a rest position to a switch-closing position where said switch-operating means cooperates with said normally open switch to close the latter when said electronic flash means is connected to said housing means by said connecting means, said adjustable means when displaced with respect to said housing means to said flash position thereof engaging said switch-operating means for displacing the latter to said switch-closing position thereof for rendering said electronic flash means operable when said adjustable means is placed in said flash position thereof.

2. The combination of claim 1 and wherein said housing means has an outer wall formed with an opening receiving part of said switch-operating means, and said adjustable means when displaced to said flash position thereof displacing said switch-operating means at said opening in part outwardly beyond said wall of said housing means.

3. The combination of claim 1 and wherein said switch-operating means is in the form of a lever supported for turning movement by said housing means.

4. The combination of claim 1 and wherein said switch-operating means is in the form of a pin supported for longitudinal movement by said housing means.

5. The combination of claim 1 and wherein said adjustable means is carried by said housing means for movement with respect thereto along a substantially straight path.

6. The combination of claim 1 and wherein said adjustable means is carried by said housing means for rotary movement with respect thereto.

7. The combination of claim 6 and wherein said adjustable means is turnable about an optical axis and carries a cam which engages said switch-operating means for displacing the latter to said switch-closing position thereof when said adjustable means is turned to said flash position thereof.

* * * * *